US005198138A

United States Patent [19]

Yamamoto et al.

[11] Patent Number: 5,198,138

[45] Date of Patent: Mar. 30, 1993

[54] SPHERICAL FERRITE PARTICLES AND FERRITE RESIN COMPOSITE FOR BONDED MAGNETIC CORE

[75] Inventors: Shigehisa Yamamoto; Masaru Kawabata, both of Hiroshima, Japan

[73] Assignee: Toda Kogyo Corp., Hiroshima, Japan

[21] Appl. No.: 773,329

[22] Filed: Oct. 11, 1991

Related U.S. Application Data

[63] Continuation-in-part of Ser. No. 506,608, Apr. 10, 1990, abandoned.

[30] Foreign Application Priority Data

| | | | |
|---|---|---|---|
| Apr. 19, 1989 | [JP] | Japan | 1-101204 |
| Feb. 28, 1990 | [JP] | Japan | 2-50715 |
| Oct. 18, 1990 | [JP] | Japan | 2-280967 |
| Oct. 18, 1990 | [JP] | Japan | 2-280968 |

[51] Int. Cl.[5] ....................... C04B 35/04; C04B 35/26; C04B 35/64; H01F 1/00

[52] U.S. Cl. ............................... 252/62.54; 252/62.56; 252/62.62

[58] Field of Search ................ 252/62.54, 62.56, 62.62

[56] References Cited

U.S. PATENT DOCUMENTS

| | | | |
|---|---|---|---|
| 2,579,978 | 12/1951 | Snoek | 252/62.62 |
| 3,914,181 | 10/1975 | Berg | 252/62.56 |
| 4,267,065 | 5/1981 | Johnson, Jr. et al. | 252/62.62 |
| 4,268,430 | 5/1981 | Suzuki et al. | 260/37 |
| 4,301,020 | 11/1981 | Johnson, Jr. et al. | 252/62.62 |
| 4,336,308 | 6/1982 | Yamada et al. | 252/62.54 |
| 4,352,717 | 10/1982 | Watanabe | 159/4 |
| 4,372,865 | 2/1983 | Yu et al. | 252/62.56 |
| 4,911,855 | 3/1990 | Rasicci | 252/62.54 |

FOREIGN PATENT DOCUMENTS 0044592 1/1982 European Pat. Off. .

*Primary Examiner*—Jerry Johnson

*Attorney, Agent, or Firm*—Nixon & Vanderhye

[57] ABSTRACT

Disclosed herein are ferrite particles for a bonded magnetic core comprising crystal grains of 5 to 15 μm in average diameter, having an average particle diameter of 20 to 150 μm and a magnetic permeability of not less than 24, and consisting essentially of 47 to 58 mol % of $Fe_2O_3$, 10 to 30 mol % of nickel oxide, manganese oxide, nickel-managanese oxide (calculated as NiO, MnO or NiO.MnO) and 15 to 40 mol % of zinc oxide (calculated as ZnO).

10 Claims, 6 Drawing Sheets

(x650)

(x650)

(x650)

(×650)

(×650)

(x650)

(x650)

(x650)

(x650)

(×650)

(×650)

(x650)

SPHERICAL FERRITE PARTICLES AND FERRITE RESIN COMPOSITE FOR BONDED MAGNETIC CORE

CROSS-REFERENCE TO RELATED APPLICATION

This application is a continuation-in-part of U.S. patent application, Ser. No. 07/506,608 filed on Apr. 10, 1990 now abandoned.

BACKGROUND OF THE INVENTION

The present invention relates to ferrite particles for a bonded magnetic core and a ferrite resin composite which has a large magnetic permeability and an excellent fluidity.

Ferrite particles and a ferrite resin composite in the present invention are mainly used as a magnetic core material of an induction coil for various electronic machines such as a computer, communications apparatus and home appliances, and a magnetic core material of a transformer, electromagnetic wave absorption or shielding, etc.

As well known, a bonded magnetic core which is superior to a sintered magnetic core in dimensional stability, processability and resistance to brittleness, is advantageous in that a small or thin core is realizable and mass production of even cores having a complicated shape is easy. With the recent development of electronics, the demands for providing lighter-weight, miniaturization and higher-accuracy cores which are to be produced by making good use of these advantages has been increasing.

A bonded magnetic core is generally produced by kneading a magnetic material with a resin such as nylon and phenol resin, and molding the resultant mixture by compression molding or injection molding.

As the magnetic material, an oxide material such as Mn-Zn ferrite and Ni-Zn ferrite is used. Such an oxide magnetic material is generally obtained by mixing a main raw material such as $Fe_2O_3$, ZnO and MnO or NiO in advance by wet or dry blending so as to have a desired composition, granulating the resultant mixture into particles having a diameter of about several mm to several ten mm, calcining the obtained particles and pulverizing the calcined particles into particles having an average particle diameter of several μm to several hundred μm.

A bonded magnetic core is required to have a magnetic permeability as large as possible. This demand has been increasing with the recent demand for a bonded magnetic core having a higher capacity.

It is known that a bonded magnetic core is composed of a magnetic material combined with a resin such as nylon and phenol resin, as described above, and that various properties, in particular, the magnetic permeability of the bonded core has a closer relation to and is more influenced by the properties of the magnetic material used in comparison with a sintered core. Therefore, in order to obtain a bonded magnetic core having a large magnetic permeability, it is advantageous to use ferrite particles having a large magnetic permeability as a magnetic material.

With the recent tendency toward bonded magnetic cores having a higher capacity, demands for smaller, thinner and complicated-molded products has been increasing. To satisfy such demands, it is important that a ferrite resin composite can sufficiently fill in all parts of the mold. For this purpose, the ferrite resin composite is required to have an excellent fluidity.

However, in the ferrite particles produced by mixing raw materials such as $Fe_2O_3$, ZnO and MnO or NiO, granulating the resultant mixture into particles having a diameter of about several mm to several ten mm, calcining the obtained particles at a high temperature and pulverizing the calcined particles in accordance with the above-described conventional method, the crystal grains grow as large as several hundred μm and become non-uniform. In addition, the crystal grain contains many pores. Due to the non-uiniform crystal grains and the presence of many pores, the magnetic permeability is lowered. As a result the obtained ferrite particles show a small magnetic permeability as magnetic powder. Furthermore, since the magnetic powder itself is angular particles by pulverization, the fluidity thereof is too poor for a suitable magnetic material for a bonded magnetic core.

A magnetic material suitable for obtaining a bonded magnetic core having a large magnetic permeability was conventionally proposed.

For example, in the method described in Japanese Patent Application Laid-Open (KOKAI) No. 55-103705 (1980), mixed ferrite particles consisting of particle groups having different particle sizes of from 100 μm to 5 mm in diameter, for example, a large-particle group having a diameter of 400 μm to 5 mm and a small-particle group having a diameter of 100 to 350 μm are used as a magnetic material for obtaining a molded product (bonded core) having a large initial magnetic permeability. However, since the mixed ferrite particles contain particles having a large diameter such as 5 mm, they are not suitable as a magnetic material for a bonded magnetic core.

The magnetic permeability and the fluidity of the ferrite resin composite for producing a bonded magnetic core are mainly dependent on the properties of the ferrite particles which are mixed with base materials of a resin composite. The magnetic permeability of the ferrite resin composite has a tendency to be enlarged with the increase in the magnetic permeability of the ferrite particles mixed. The fluidity of the ferrite resin composite has a tendency to become more excellent as the average particle diameter of the ferrite particles mixed becomes smaller and the surfaces of the particles becomes smoother. The magnetic permeability of the ferrite particles has a close relation to the average particle diameter and, hence, the magnetic permeability of the ferrite resin composite is enlarged with the increase in the average particle diameter. On the other hand, when the average particle of the ferrite particles increases, the fluidity of the ferrite resin composite is deteriorated.

As to the relationship between the magnetic permeability and the average particle diameter of the ferrite particles obtained by the conventional method, when the average particle diameter is about 100 μm, the magnetic permeability is about 18, and when the average particle diameter is about 200 μm, the magnetic permeability is about 23.

Therefore, in order to obtain a ferrite resin composite having a large magnetic permeability and an excellent fluidity, the ferrite particles mixed are required to have an appropriate average particle diameter which produces a large magnetic permeability and does not obstruct the fluidity, in particular, an average particle diameter of not more than 200 μm, and to have as smooth a surface as possible.

In the researches undertaken so as to provide ferrite particles which have a large magnetic permeability, an appropriate particle diameter and an excellent smoothness, the present inventors have noticed that in order to produce ferrite particles having a large magnetic permeability, it is necessary to obtain ferrite particle having uniform crystal grains and an appropriate grain size and containing no pore, and that in order to obtain such ferrite particles, it is important to use spherical granules for calcination which satisfy all the following conditions: (1) pores are easy to diffuse in the ferrite particles, (2) the ferrite particles are easy to balance with the calcination atmosphere, and (3) the ferrite particles easily receive heat uniformly. The present inventors have also paid attention to spray drying which is capable of granulation substantially in the form of a sphere. As a result, it has been found that by dispersing and mixing a mixed powder for producing ferrite particles consisting essentially of 47 to 58 mol %, calculated as $Fe_2O_3$, of iron oxide or iron oxide hydroxide powder, 10 to 30 mol %, calculated as NiO, of nickel oxide powder and/or calculated as MnO, of manganese oxide powder and 15 to 40 mol %, calculated as ZnO, of zinc oxide powder into and with water containing 0.2 to 1.0 wt % of a surfactant based on the weight of the mixed powder for producing ferrite particles so as to prepare a water-dispersed slurry having a slurry concentration of 40 to 60 wt %, spray-drying the resultant slurry so as to obtain the granules having an average particle diameter of 25 to 180 μm, and calcining the obtained granules at a temperature of 1100° to 1350° C., the obtained ferrite particles comprises crystal grains of 5 to 15 μm in average diameter, and have an average particle diameter of 20 to 150 μm and a magnetic permeability of not less than 24. The present invention has been achieved on the basis of this finding.

SUMMARY OF THE INVENTION

In a first aspect of the present invention, there are provided ferrite particles for a bonded magnetic core comprising crystal grains of 5 to 15 μm in average diameter, having an average particle diameter of 20 to 150 μm and a magnetic permeability of not less than 24, and consisting essentially of 47 to 58 mol % of $Fe_2O_3$, 10 to 30 mol % of nickel oxide, manganese oxide or nickel manganese oxide (calculated as NiO, MnO or NiO MnO) and 15 to 40 mol % of zinc oxide (calculated as ZnO).

In a second aspect of the present invention, there is provided a ferrite resin composite comprising 90 to 95 wt % of ferrite particles which comprises crystal grains of 5 to 15 μm in average diameter and having an average particle diameter of 20 to 150 μm, and 5 to 10 wt % of base materials of a resin composite, said ferrite resin composite having a magnetic permeability of not less than 24.

In a third aspect of the present invention, there is provided a process for producing ferrite particles for a bonded magnetic core as defined in the 1st aspect, said process comprising the steps of dispersing and mixing a powder for producing ferrite particles consisting essentially of 47 to 58 mol %, calculated as $Fe_2O_3$, of an iron oxide or iron oxide hydroxide powder, 10 to 30 mol %, calculated as NiO, of a nickel oxide powder and/or calculated as MnO, of a manganese oxide powder and 15 to 40 mol %, calculated as ZnO, of an zinc oxide powder as a starting material into and with water containing 0.2 to 1.0 wt % of a surfactant based on the weight of the powder for producing ferrite particles so as to prepare a water-dispersed slurry having a slurry concentration of 40 to 60 wt %, spray-drying the resultant slurry so as to obtain granules having an average particle diameter of 25 to 180 μm, and calcining the obtained granules at a temperature of 1100° to 1350° C.

BRIEF DESCRIPTION OF THE DRAWINGS

FIGS. 1 to 6 are scanning-type electron micrographs (×650), in which

FIGS. 1, 2 and 3 show the structures of the ferrite particles for a bonded magnetic core obtained in Examples 1, 2 and 4, respectively; and FIGS. 4, 5 and 6 show the structures of the ferrite particles obtained in Comparative Examples 3, 4 and 7, respectively.

FIGS. 7 to 12 are scanning-type electron micrographs (×650), in which

FIGS. 7, 8 and 9 show the structures of the ferrite particles for a bonded magnetic core obtained in Examples 12, 13 and 15, respectively; and FIGS. 10, 11 and 12 show the structures of the ferrite particles obtained in Comparative Examples 14, 15 and 18, respectively.

DETAILED DESCRIPTION OF THE INVENTION

Figure 1:
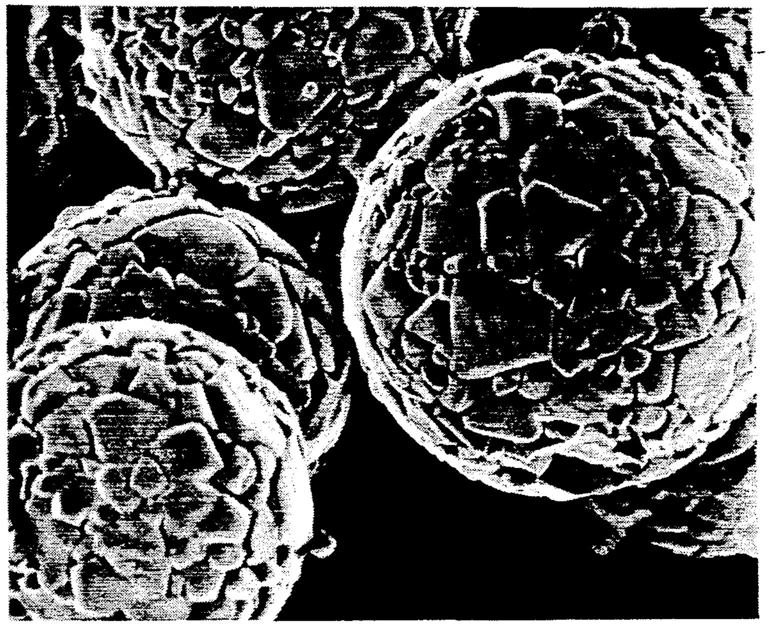
Figure 2:
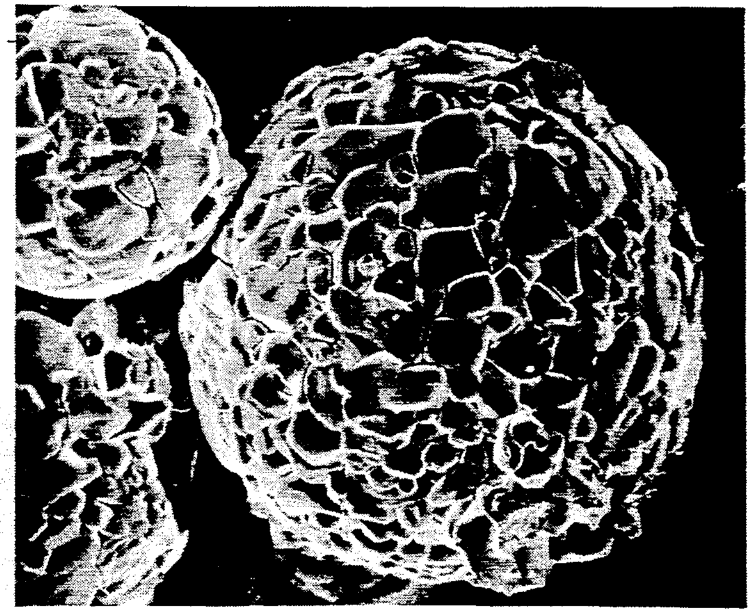
Figure 3:
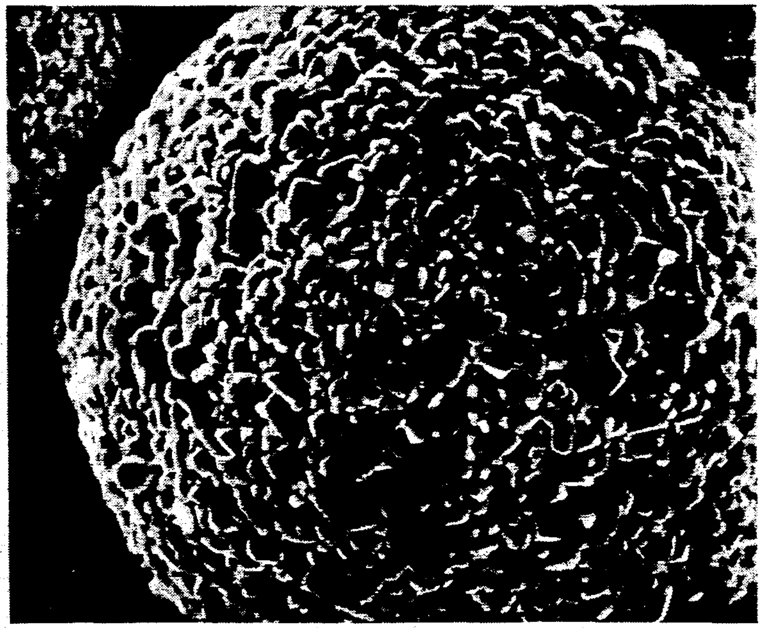
Figure 4:
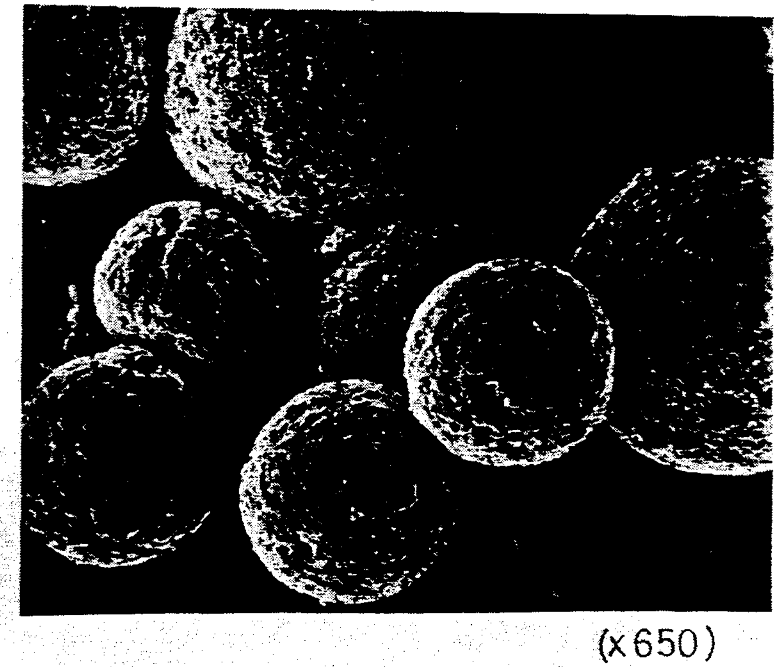
Figure 5:
Figure 6:

The ferrite spherical particles as ferrite particles, comprising crystal grains of 5 to 15 μm in average diameter and having an average particle diameter of 20 to 150 μm of the present invention are produced by using an iron oxide or iron oxide hydroxide powder, a zinc oxide powder and a nickel oxide powder and/or a manganese oxide powder as starting materials.

More specifically, (1) the preferable ferrite spherical particles are produced by dispersing and mixing a mixed powder for producing ferrite particles of 47 to 55 mol %, preferably 48 to 53 mol %, calculated as $Fe_2O_3$, of iron oxide powder or iron oxide hydroxide powder, 10 to 23 mol %, preferably 13 to 20 mol %, calculated as NiO, of nickel oxide powder and 25 to 40 mol %, preferably 27 to 39, calculated as ZnO, of zinc oxide powder into and with water containing 0.2 to 1.0 wt % of a surfactant based on the weight of the mixed powder for producing ferrite particles so as to prepare a water-dispersed slurry having a slurry concentration of 40 to 60 wt %, spray-drying the resultant slurry so as to obtain the granules having an average particle diameter of 25 to 180 μm, and calcining the obtained granules at a temperature of 1100° to 1350° C.

(2) The preferable ferrite spherical particles are produced by dispersing and mixing a mixed powder for producing ferrite particles of 47 to 58 mol %, preferably 48 to 56 mol %, calculated as $Fe_2O_3$, of iron oxide powder or iron oxide hydroxide powder, 22 to 30 mol %, preferably 25 to 29 mol %, calculated as MnO, of manganese oxide powder and 15 to 32 mol %, preferably 17 to 24, calculated as ZnO, of zinc oxide powder into and with water containing 0.2 to 1.0 wt % of a surfactant based on the weight of the mixed powder for producing ferrite particles so as to prepare a water-dispersed slurry having a slurry concentration of 40 to 60 wt %, spray-drying the resultant slurry so as to obtain the granules having an average particle diameter of 25 to 180 μm, and calcining the obtained granules at a temperature of 1150° to 1350° C.

(3) The preferable ferrite spherical particles are produced by dispersing and mixing a mixed powder for producing ferrite particles of 47 to 58 mol %, preferably 48 to 56 mol %, calculated as $Fe_2O_3$, of iron oxide powder or iron oxide hydroxide powder, 15 to 28 mol %, preferably 20 to 26 mol %, calculated as NiO and MnO, of nickel oxide powder and manganese oxide powder, and 20 to 35 mol %, preferably 22 to 30, calculated as ZnO, of zinc oxide powder into and with water containing 0.2 to 1.0 wt % of a surfactant based on the weight of the mixed powder for producing ferrite particles so as to prepare a water-dispersed slurry having a slurry concentration of 40 to 60 wt %, spray-drying the resultant slurry so as to obtain the granules having an average particle diameter of 25 to 180 μm, and calcining the obtained granules at a temperature of 1150° to 1350° C.

The reason why the ferrite spherical particles having a magnetic permeability of not less than 24, are obtained according to the present invention is considered to be that the ferrite spherical particles obtained by the process according to the present invention comprises uniform crystal grains of an appropriate size containing few pores.

Since the ferrite particles for a bonded magnetic core according to the present invention are spherical particles having appropriate sizes unlike the irregular, the particles of the present invention have an excellent fluidity which facilitates the production of a molded product having a complicated shape when the ferrite particles are kneaded with a resin and molded, especially, by injection molding.

The ferrite particles for a bonded magnetic core according to the present invention comprises ferrite particles having a composition of 47 to 58 mol % of $Fe_2O_3$, 10 to 30 mol % of nickel oxide, manganese oxide or nickel.manganese oxide (calculated as NiO, MnO or NiO.MnO) and 15 to 40 mol % of zinc oxide (calculated as ZnO). The particles having a composition other than this ranges are unfavorable for practical use because the magnetic permeability is apt to be lowered.

More particularly, as preferable ferrite particles of the present invention, ferrite particles having a composition of (1) 47 to 55 mol %, preferably 48 to 53 mol % of $Fe_2O_3$, 10 to 23 mol %, preferably 13 to 20 mol % of nickel oxide (calculated as NiO) and 25 to 40 mol %, preferably 27 to 39 mol % of zinc oxide (calculated as ZnO), (2) a composition of 47 to 58 mol %, preferably 48 to 56 mol % of $Fe_2O_3$, 22 to 30 mol %, preferably 25 to 29 mol % of manganese oxide (calculated as MnO) and 15 to 32 mol %, preferably 17 to 24 mol % of zinc oxide (calculated as ZnO), and (3) a composition of 47 to 58 mol %, preferably 48 to 56 mol % of $Fe_2O_3$, 15 to 28 mol %, preferably 20 to 26 mol % of nickel.manganese oxide (calculated as NiO.MnO) and 20 to 35 mol %, preferably 22 to 30 mol % of zinc oxide (calculated as ZnO).

The ferrite particles for a bonded magnetic core according to the present invention comprise ferrite spherical particles having an average diameter of 20 to 150 μm, preferably 30 to 140 μm and comprising crystal grains of 5 to 15 μm, preferably 5 to 13 μm in average diameter. If the average particle diameter of the ferrite particles is less than 20 μm, the growth of the particles is unfavorably insufficient. The average particle diameter of more than 150 μm is also unfavorable because the crystal grains abnormally grow and many pores tend to remain therein, thereby lowering the magnetic permeability.

In order to obtain the ferrite particles for a bonded magnetic core according to the present invention, it is necessary to control the average particle diameter of the granules before calcination in the range of 20 to 180 μm.

For this purpose, it is necessary to disperse and mix the mixed powder for producing ferrite particles into and with water containing 0.2 to 1.0 wt %, preferably 0.2 to 0.8 wt % of a surfactant based on the weight of the mixed powder for producing ferrite particles, thereby obtaining a water-dispersed slurry having a slurry concentration of 40 to 60 wt %, preferably 40 to 55 wt %, and thereafter to spray-dry the resultant slurry. If the slurry concentration is less than 40 wt %, the spray-drying efficiency is lowered, which often leads to the reduction in the productivity. If the slurry concentration is more than 60 wt %, it is difficult to supply and spray-dry the slurry and, hence, it is difficult to produce the ferrite particles for a bonded core of the present invention.

As the iron oxide, which is one of the starting materials of the present invention, $\alpha$-$Fe_2O_3$, $\gamma$-$Fe_2O_3$ and $Fe_3O_4$ are usable. As the ion oxide hydroxide, $\alpha$-FeOOH, $\beta$-FeOOH and $\gamma$-FeOOH are usable.

As the surfactant, surfactants generally used as a dispersant for a water-dispersed slurry, for example, alkali salts, amine salts and ammonium salts of anionic surfactants, carboxylate, sulfonate, lower fatty acid salts and hydrochlorides of cationic surfactants are usable. The amount of surfactant used is preferably 0.2 to 1.0 wt % based on the weight of the mixed powder for producing ferrite particles in consideration of sphericity of the ferrite particles obtained.

The calcining temperature is in the range of 1100° to 1350° C., preferably 1150° to 1330° C. If the temperature is lower than 1100° C., it is difficult to obtain large crystal grains. If it exceeds 1350° C., the abnormal growth of the crystal grains is accelerated, so that the crystal grains become unfavorably nonuniform and contain many pores.

The thus-obtained ferrite spherical particles of the present invention comprise crystal grains of 5 to 15 μm in average diameter, and have an average particle diameter of 20 to 150 μm and a magnetic permeability of not less than 24, preferably not less than 25, more preferably not less than 26.

The ferrite resin composite according to the present invention is a mixture of the above-described ferrite spherical particles comprising crystal grains of 5 to 15 μm in average diameter and having an average particle diameter of 20 to 150 μm and a resin, and has a magnetic permeability of not less than 24 and an excellent fluidity.

The ferrite spherical particles of the present invention may be coated in advance with a coupling agent which is generally used as a surface treating agent, for example, a silane coupling agent, titanium coupling agent, aluminum coupling agent and zircoaluminate coupling agent, or a cationic, anionic or nonionic surfactant in order to enhance various properties such as the dispersibility.

The mixing ratio (wt %) of the ferrite spherical particles to the base materials of a resin composite according to the present invention is 90 to 95/5 to 10, preferably 92 to 94/6 to 8 in consideration of the magnetic permeability and the fluidity of the ferrite resin composite.

The base materials of a resin composite in the present invention is a resin with a plasticizer, lubricant, antioxidant, etc., added thereto, if necessary.

As the resin, those generally used for a resin component are usable. Concrete examples thereof are a thermoplastic resin such as a polystyrene resin, polyethylene resin, AS resin (acrylonitrile-styrene copolymer), ABS resin (acrylonitrile-butadiene-styrene copolymer), vinyl chloride resin, EVA resin (ethylene-vinylacetate copolymer), PMMA resin (polymethylmethacrylate), polyamide resin, polypropylene resin, EEA resin (ethylene-ethylacrylate copolymer) and PPS resin (polyphenylene sulfide), and a thermosetting resin such as a phenol resin, urea resin, melamine resin, alkyd resin, epoxy resin and polyurethane resin.

Although the ferrite resin composite of the present invention is usable both for compression molding and for injection molding, since the fluidity thereof is excellent, it is preferably used for injection molding.

The ferrite spherical particles of the present invention, which have an average particle diameter of 20 to 150 $\mu m$ and a magnetic permeability of not less than 24, are suitable as ferrite particles for a bonded magnetic core.

A ferrite resin composite of the present invention has a large magnetic permeability such as not less than 24, preferably not less than 25, more preferably not less than 26 due to the large magnetic permeability of the ferrite particles which are mixed with the base materials of a resin composite, and an excellent fluidity due to the ferrite particles having appropriate size and smooth spherical surfaces. The ferrite resin composite of the present invention is thereof suitable as a ferrite resin composite which is now demanded.

In addition, the application of the ferrite resin composite of the present invention, which has a large magnetic permeability, to an electromagnetic wave absorber and an electromagnetic wave insulator is expected.

EXAMPLES

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

In the following examples and comparative examples, a cylindrical molded product having an outer diameter of 36 mm, an inner diameter of 24 mm and a height of 10 mm was produced by the press-molding of the granules composed of a mixture of 20 parts by weight of ferrite particles and 1 part by weight of polyvinyl alcohol (MĀBOZŌ RU T-30 produced by Matsumoto Yushi Seiyaku Co., Ltd.) under a pressure of 1 ton/cm$^2$ as a sample being measured. The magnetic permeability of the ferrite particles are expressed by the values obtained by measuring the magnetic permeability of the thus-obtained molded product which has been wound with a winding at 40 turns, by an impedance analyzer 4194A (produced by Hewlet Packard, Ltd.) at a frequency of 1 MHz.

The magnetic permeability of the ferrite resin composite of the present invention was measured by the same method described above except for using a cylindrical molded product having an outer diameter of 36 mm, an inner diameter of 24 mm and a height of 10 mm, and produced by the press-molding of the granules of the ferrite resin composite.

EXAMPLE 1

33.85 kg of iron oxide ($\alpha$-$Fe_2O_3$), 6.10 kg of nickel oxide and 10.95 kg of zinc oxide were mixed to produce a mixed powder for producing ferrite particles which correspond to 50.1 mol % of $Fe_2O_3$, 18.7 mol % of NiO and 31.2 mol % of ZnO, respectively. The mixed powder was then charged into 60.5 l of an aqueous solution of 0.3 wt % of polycarboxylic acid ammonium salt (SN dispersant 5468: produced by Sannopco Co., Ltd.) based on the weight of the mixed powder for producing ferrite particles. The slurry concentration in the aqueous solution was 45.7 wt %. The slurry was spray-dried to obtain granules having an average particle diameter of 105 $\mu m$.

The granules obtained were calcined at a temperature of 1320° C. for 3 hours to obtain ferrite particles for a bonded magnetic core which was composed of nickel zinc ferrite spherical particles.

The magnetic permeability of the ferrite particles for a bonded magnetic core obtained was 32.7. It was confirmed from the observation of the scanning-type electron micrograph shown in FIG. 1 that the ferrite particles were nickel zinc ferrite spherical particles which were composed of crystal grains 12.2 $\mu m$ in average diameter and which had an average particle diameter of 80 $\mu m$ and few pores.

EXAMPLES 2 TO 6, COMPARATIVE EXAMPLES 1 TO 7

Ferrite particles for a bonded magnetic core were produced in the same way as in Example 1 except for varying the composition of the mixed powder for producing ferrite particles, the kind and the amount of surfactant, the concentration of the mixed slurry for producing ferrite particles, the particle size of the granules and the calcining temperatures.

The main producing conditions and the properties of the ferrite particles for a bonded magnetic core are shown in Table 1.

In Example 3, $Fe_3O_4$ was used as the iron oxide material and in Example 5, polycarboxylic acid sodium salt (Nobcosant K: produced by Sannopco Co., Ltd.) was used as the surfactant.

In Comparative Example 7, the mixed powder for producing ferrite particles was granulated into granules about 5 mm in diameter by the conventional method without spray-drying, the granules were calcined at a temperature of 1250° C., and the calcined granules were then pulverized to obtain ferrite particles for a bonded magnetic core having a particle diameter of 39 $\mu m$ and containing many pores.

EXAMPLE 7

190 g (equivalent to 94.9 wt % based on the composite) of the ferrite particles obtained in Example 1, 10 g (equivalent to 5.0 wt % based on the composite) of ethylene-vinyl acetate copolymer resin (Evaflex 250, density: 0.95 g/cc, produced by Mitsui Polychemical Co., Ltd.) and 0.2 g (equivalent to 0.1 wt % based on the composite) of zinc stearate were kneaded at 110° C. for 15 minutes by a blast mill 30C-150 (produced by Toyo Seiki Co., Ltd.) to obtain a kneaded mixture.

The thus-obtained kneaded mixture was granulated into granules having an average particle diameter of about 3 mm, and press-molded at a temperature of 75° C. and a pressure of 1.5 ton/cm$^2$ to obtain a cylindrical molded product having an outer diameter of 36 mm, an inner diameter of 24 mm and a height of 10 mm. Since the ferrite resin composite filled in all parts of the mold including every corner, the surface of the molded product was smooth and the circumferential portions of the upper surface and the lower surface of the cylinder are formed into complete circles without any chipping and deformation.

The magnetic permeability of the molded product was 31.0.

EXAMPLES 8 TO 11 AND COMPARATIVE EXAMPLES 8 TO 11

Ferrite resin composites were produced in the same way as in Example 7 except for varying the kind and the amount of ferrite particles, the kind and amount of additive and the kneading temperature and time.

The main producing conditions and the properties of the composites obtained are shown in Table 2.

Since the ferrite resin composite filled in all parts of the mold including every corner, the molded product produced from the ferrite resin composite obtained in any of Examples 8 to 11 had a smooth surface and complete circular circumferential portions of the upper surface and the lower surface of the cylinder without any chipping and deformation like the molded product obtained in Example 7.

In contrast, in the molded products produced from the ferrite resin composites obtained in Comparative Examples 8 and 11, the surfaces were uneven and chipping or deformation was observed at a part of the circumferential portions of the upper surface and the lower surface of the cylinder.

TABLE 1

| Examples & Comparative Examples | Mixing ratio of raw materials | | | Amount of Surfactant (wt %) | Slurry concentration (wt %) | Average particle diameter of granules (μm) | Calcining temperature (°C.) | Ferrite particles for bonded magnetic core | | |
|---|---|---|---|---|---|---|---|---|---|---|
| | $Fe_2O_3$ (mol %) | NiO (mol %) | ZnO (mol %) | | | | | Magnetic permeability | Average particle diameter of crystal grains (μm) | Average particle diameter (μm) |
| Example 1 | 50.1 | 18.7 | 31.2 | 0.3 | 45.7 | 105 | 1320 | 32.7 | 12.2 | 80 |
| Example 2 | 50.1 | 18.7 | 31.2 | 0.3 | 45.7 | 120 | 1280 | 30.2 | 9.5 | 100 |
| Example 3 | 50.1 | 18.7 | 31.2 | 0.3 | 45.7 | 99 | 1150 | 28.0 | 8.2 | 79 |
| Example 4 | 50.1 | 18.7 | 31.2 | 0.7 | 52.0 | 170 | 1100 | 25.3 | 5.1 | 139 |
| Example 5 | 52.0 | 17.5 | 30.5 | 0.3 | 50.2 | 115 | 1300 | 31.5 | 8.3 | 85 |
| Example 6 | 48.3 | 14.5 | 37.2 | 0.3 | 41.3 | 46 | 1320 | 26.2 | 9.2 | 34 |
| Comparative Example 1 | 50.1 | 18.7 | 31.2 | 0.75 | 58.3 | 250 | 1250 | 20.2 | 10.0 | 200 |
| Comparative Example 2 | 50.1 | 18.7 | 31.2 | 0.3 | 30.6 | 18 | 1150 | 18.3 | 2.2 | 15 |
| Comparative Example 3 | 49.8 | 18.6 | 31.6 | 0.5 | 43.2 | 53 | 1000 | 12.0 | 1.5 | 45 |
| Comparative Example 4 | 49.8 | 18.6 | 31.6 | 0.5 | 43.2 | 89 | 1380 | 18.6 | 20.0 | 67 |
| Comparative Example 5 | 43.2 | 23.0 | 33.8 | 0.5 | 43.2 | 97 | 1250 | 7.0 | 8.5 | 75 |
| Comparative Example 6 | 60.2 | 27.5 | 12.3 | 0.5 | 43.2 | 102 | 1180 | 5.0 | 5.3 | 80 |
| Comparative Example 7 | 49.5 | 18.4 | 32.1 | — | — | — | 1250 | 17.5 | 27.1 | 39 |

TABLE 2

| Examples & Comparative Examples | Manufacture of ferrite resin composite | | | | | | | | Ferrite resin composite |
|---|---|---|---|---|---|---|---|---|---|
| | Ferrite particles | | Resin | | Additive | | Kneading | | |
| | Kind | Amount (wt %) | Kind | Amount (wt %) | Kind | Amount (wt %) | Temperature (°C.) | Time (min.) | Magnetic permeability |
| Example 7 | Example 1 | 94.9 | Evaflex 250 (produced by Mitsui Polychemical Co., Ltd.) | 5.0 | Zn stearate | 0.1 | 110 | 15 | 31.0 |
| Example 8 | Example 1 | 92.9 | Evaflex 250 (produced by Mitsui Polychemical Co., Ltd.) | 7.0 | Zn stearate | 0.1 | 100 | 15 | 28.4 |
| Example 9 | Example 2 | 94.9 | Evaflex 250 (produced by Mitsui Polychemical Co., Ltd.) | 5.0 | Zn stearate | 0.1 | 110 | 15 | 28.7 |
| Example 10 | Example 1 | 91.9 | 12-Nylon 3014U (produced by Ube Industries, Ltd.) | 8.0 | Ca stearate | 0.1 | 250 | 15 | 28.5 |
| Example 11 | Example 5 | 90.9 | 12-Nylon 3014U (produced by Ube Industries, Ltd.) | 9.0 | Ca stearate | 0.1 | 250 | 15 | 27.2 |
| Comparative Examples 8 | Comparative Examples 1 | 94.9 | Evaflex 250 (produced by Mitsui Polychemical Co., Ltd.) | 5.0 | Zn stearate | 0.1 | 110 | 15 | 18.6 |

TABLE 2-continued

| Examples & Comparative Examples | Manufacture of ferrite resin composite: Ferrite particles: Kind | Amount (wt %) | Resin: Kind | Amount (wt %) | Additive: Kind | Amount (wt %) | Kneading: Temperature (°C.) | Time (min.) | Ferrite resin composite: Magnetic permeability |
|---|---|---|---|---|---|---|---|---|---|
| Comparative Examples 9 | Comparative Examples 2 | 94.9 | Evaflex 250 (produced by Mitsui Polychemical Co., Ltd.) | 5.0 | Zn stearate | 0.1 | 120 | 15 | 16.8 |
| Comparative Examples 10 | Comparative Examples 3 | 91.9 | 12-Nylon 3014U (produced by Ube Industries, Ltd.) | 8.0 | Ca stearate | 0.1 | 250 | 15 | 10.6 |
| Comparative Examples 11 | Comparative Examples 7 | 94.9 | Evaflex 250 (produced by Mitsui Polychemical Co., Ltd.) | 5.0 | Zn stearate | 0.1 | 120 | 15 | 16.5 |

EXAMPLE 12

41.92 kg of iron oxide ($\alpha$-$Fe_2O_3$), 11.44 kg of manganese oxide ($MnO_2$) and 8.63 kg of zinc oxide (ZnO) were mixed to produce a mixed powder for producing ferrite particles which correspond to 52.4 mol % of $Fe_2O_3$, 26.4 mol % of MnO and 21.2 mol % of ZnO, respectively. The mixed powder was then charged into 60.0 l of an aqueous solution of 0.3 wt % of polycarboxylic acid ammonium salt (SN dispersant 5468: produced by Sannopco Co., Ltd.) based on the weight of the mixed powder for producing ferrite particles. The slurry concentration in the aqueous solution was 50.8 wt %. The slurry was spray-dried to obtain granules having an average particle diameter of 110 μm.

The granules obtained were calcined at a temperature of 1340° C. for 3 hours to obtain ferrite particles for a bonded magnetic core which was composed of manganese zinc ferrite spherical particles. Thereafter, the thus-obtained ferrite particles were cooled flowing nitrogen gas.

Figure 7:
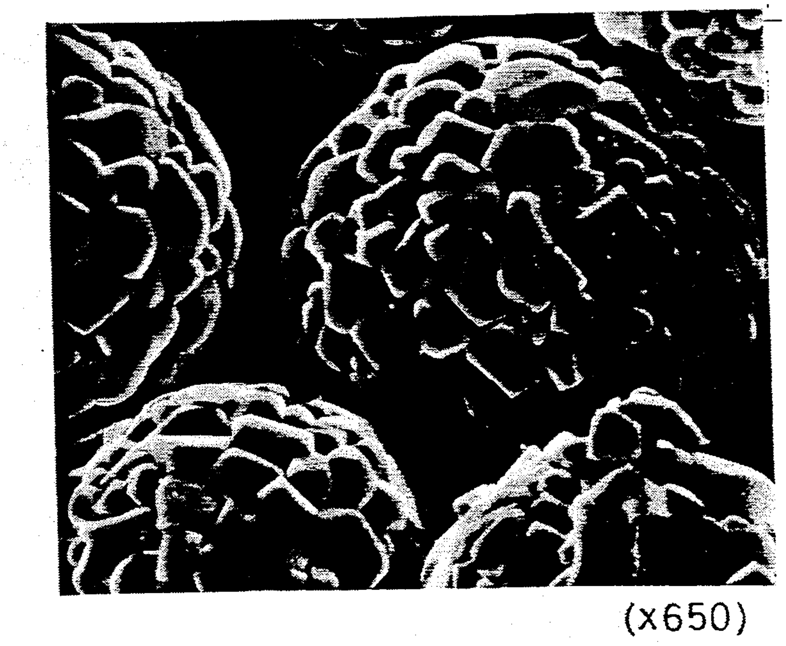
Figure 8:
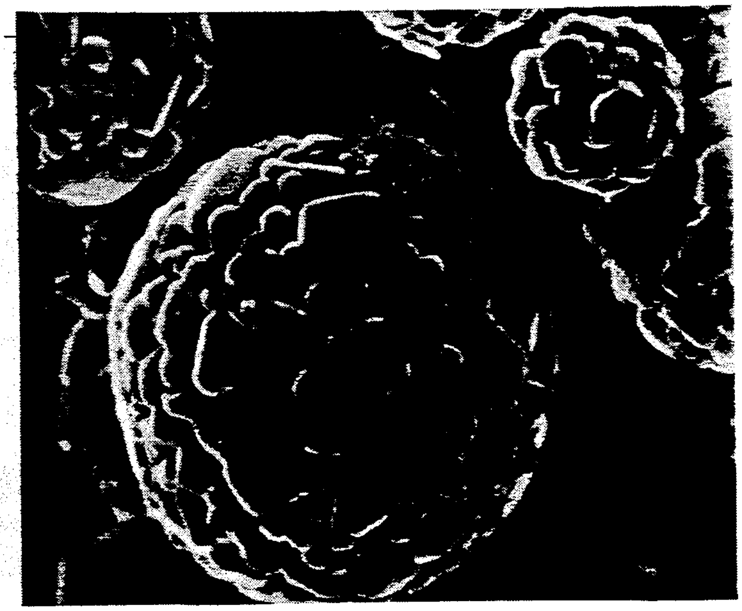
Figure 9:
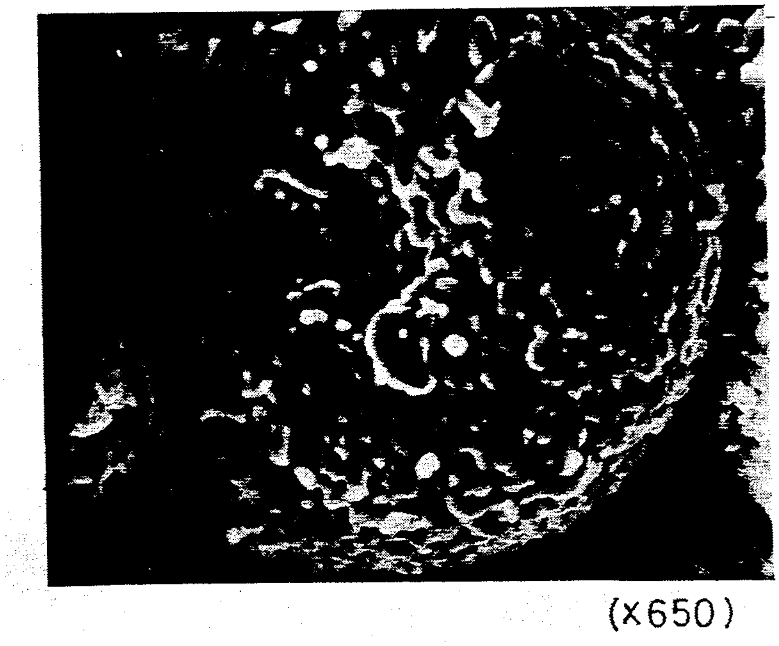
Figure 10:
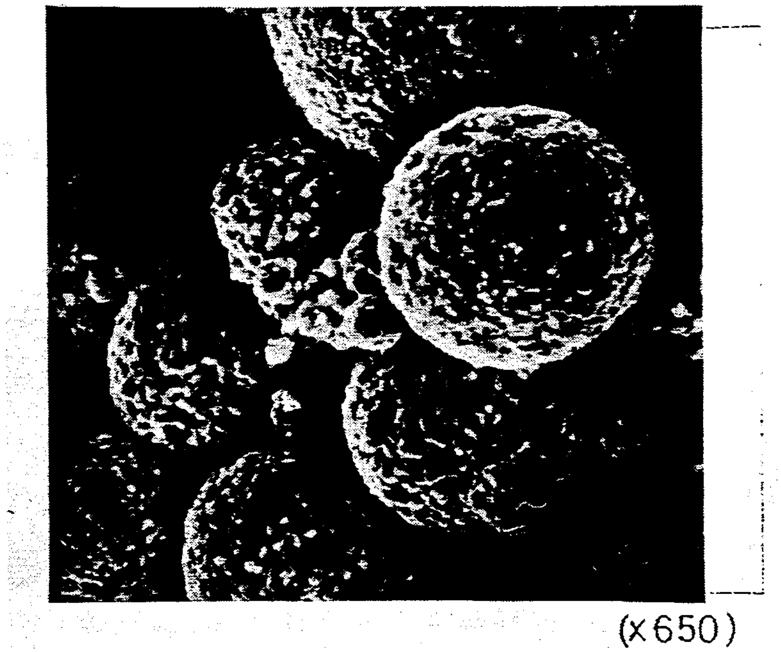
Figure 11:
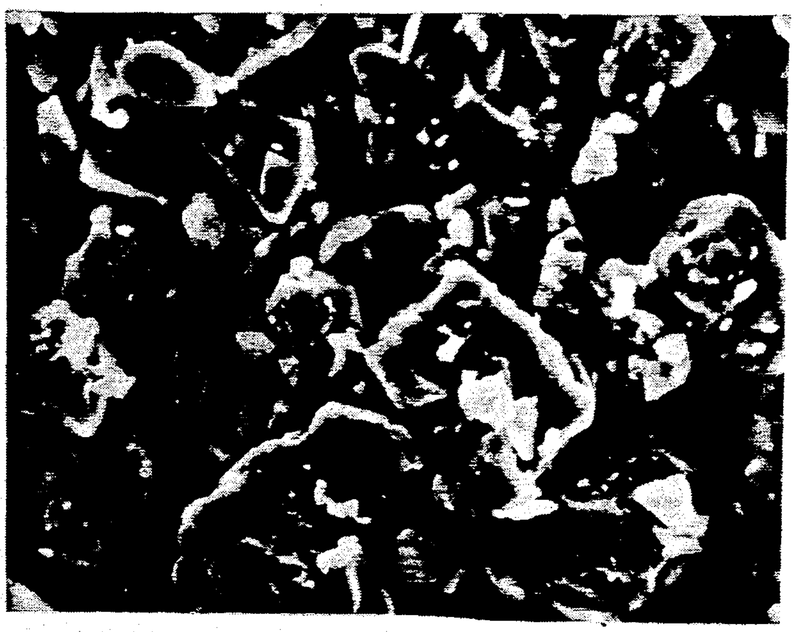
Figure 12:

The magnetic permeability of the ferrite particles for a bonded magnetic core obtained was 32.5. It was confirmed from the observation of the scanning-type electron micrograph shown in FIG. 7 that the ferrite particles were manganese zinc ferrite spherical particles which were composed of crystal grains 14.8 μm in average diameter and which had an average particle diameter of 94 μm and few pores.

EXAMPLE 13 TO 17, COMPARATIVE EXAMPLES 12 TO 18

Ferrite particles for a bonded magnetic core were produced in the same way as in Example 12 except for varying the composition of the mixed powder for producing ferrite particles, the kind and the amount of surfactant, the concentration of the mixed slurry for producing ferrite particles, the particle size of the granules and the calcining temperatures.

The main producing conditions and the properties of the ferrite particles for a bonded magnetic core are shown in Table 3.

In Example 14, $Fe_3O_4$ was used as the iron oxide material, in Example 15, $Mn_2O_3$ was used as the manganese oxide material, and in Example 16, polycarboxylic acid sodium salt (Nobcosant K: produced by Sannopco Co., Ltd.) was used as the surfactant.

In Comparative Example 18, the mixed powder for producing ferrite particles was granulated into granules about 5 mm in diameter by the conventional method without spray-drying, the granules were calcined at a temperature of 1300° C., and the calcined granules were then pulverized to obtain ferrite particles for a bonded magnetic core having a particle diameter of 46.0 μm and containing many pores.

EXAMPLE 18

190 g (equivalent to 94.9 wt % based on the composite) of the ferrite particles obtained in Exmaple 12, 19 g (equivalent to 5.0 wt % based on the composite) of ethylene-vinyl acetate copolymer resin (Evaflex 250, density: 0.95 g/cc, produced by Mitsui Polychemical Co., Ltd.) and 0.2 g (equivalent to 0.1 wt % based on the composite) of zinc stearate were kneaded at 110° C. for 15 minutes by a blast mill 30C-150 (produced by Toyo Seiki Co., Ltd.) to obtain a kneaded mixture.

The thus-obtained kneaded mixture was granulated into granules having an average particle diameter of about 3 mm, and press-molded at a temperature of 75° C. and a pressure of 1.5 ton/cm$^2$ to obtain a cylindrical molded product having an outer diameter of 36 mm, an inner diameter of 24 mm and a height of 10 mm. Since the ferrite resin composite filled in all parts of the mold including every corner, the surface of the molded product was smooth and the circumferential portions of the upper surface and the lower surface of the cylinder are formed into complete circles without any chipping and deformation.

The magnetic permeability of the molded product was 30.6.

EXAMPLE 19 TO 22 AND COMPARATIVE EXAMPLES 19 TO 22

Ferrite resin composites were produced in the same way as in Example 18 except for varying the kind and the amount of ferrite particles, the kind and amount of additive and the kneading temperature and time.

The main producing conditions and the properties of the composites obtained are shown in Table 4.

Since the ferrite resin composite filled in all parts of the mold including every corner, the molded product produced from the ferrite resin composite obtained in any of Examples 19 to 22 had a smooth surface and complete circular circumferential portions of the upper surface and the lower surface of the cylinder without any chipping and deformation like the molded product obtained in Example 18.

In contrast, in the molded products produced from the ferrite resin composites obtained in Comparative Examples 19 and 22, the surfaces were uneven and chipping or deformation was observed at a part of the circumferential portions of the upper surface and the lower surface of the cylinder.

TABLE 3

| Examples & Comparative Examples | Mixing ratio of raw materials: $Fe_2O_3$ (mol %) | MnO (mol %) | ZnO (mol %) | Amount of Surfactant (wt %) | Slurry concentration (wt %) | Average particle diameter of granules (μm) | Calcining temperature (°C.) | Ferrite particles for bonded magnetic core: Magnetic permeability | Average particle diameter of crystal grains (μm) | Average particle diameter (μm) |
|---|---|---|---|---|---|---|---|---|---|---|
| Example 12 | 52.4 | 26.4 | 21.2 | 0.3 | 50.8 | 110 | 1340 | 32.5 | 14.8 | 94 |
| Example 13 | 52.4 | 26.4 | 21.2 | 0.3 | 50.8 | 120 | 1280 | 32.3 | 10.7 | 92 |
| Example 14 | 52.4 | 26.4 | 21.2 | 0.3 | 50.8 | 95 | 1200 | 29.0 | 8.5 | 87 |
| Example 15 | 52.4 | 26.4 | 21.2 | 0.7 | 53.3 | 170 | 1180 | 28.0 | 6.0 | 125 |
| Example 16 | 55.2 | 26.3 | 18.5 | 0.3 | 50.4 | 110 | 1300 | 30.2 | 12.3 | 90 |
| Example 17 | 48.7 | 28.5 | 23.0 | 0.3 | 42.7 | 70 | 1300 | 27.0 | 10.0 | 57 |
| Comparative Example 12 | 52.4 | 26.4 | 21.2 | 0.75 | 57.5 | 260 | 1250 | 23.0 | 9.5 | 228 |
| Comparative Example 13 | 52.4 | 26.4 | 21.2 | 0.3 | 31.5 | 17 | 1200 | 19.3 | 7.4 | 15 |
| Comparative Example 14 | 48.7 | 28.5 | 23.0 | 0.5 | 48.5 | 55 | 1050 | 13.0 | 3.0 | 51 |
| Comparative Example 15 | 48.7 | 28.5 | 23.0 | 0.5 | 48.5 | 75 | 1380 | 21.0 | 20.5 | 60 |
| Comparative Example 16 | 45.0 | 27.3 | 27.7 | 0.5 | 48.5 | 80 | 1250 | 18.8 | 10.2 | 70 |
| Comparative Example 17 | 59.2 | 31.0 | 9.8 | 0.5 | 48.5 | 46 | 1170 | 15.0 | 4.6 | 42 |
| Comparative Example 18 | 52.4 | 26.4 | 21.2 | — | — | 5500 | 1300 | 17.2 | 30 | 46 |

TABLE 4

| Examples & Comparative Examples | Manufacture of ferrite resin composite: Ferrite particles Kind | Ferrite particles Amount (wt %) | Resin Kind | Resin Amount (wt %) | Additive Kind | Additive Amount (wt %) | Kneading Temperature (°C.) | Kneading Time (min.) | Ferrite resin composite Magnetic permeability |
|---|---|---|---|---|---|---|---|---|---|
| Example 18 | Example 12 | 94.9 | Evaflex 250 (produced by Mitsui Polychemical Co., Ltd.) | 5.0 | Zn stearate | 0.1 | 110 | 15 | 30.6 |
| Example 19 | Example 12 | 92.9 | Evaflex 250 (produced by Mitsui Polychemical Co., Ltd.) | 7.0 | Zn stearate | 0.1 | 100 | 15 | 28.2 |
| Example 20 | Example 13 | 94.9 | Evaflex 250 (produced by Mitsui Polychemical Co., Ltd.) | 5.0 | Zn stearate | 0.1 | 110 | 15 | 31.2 |
| Example 21 | Example 12 | 91.9 | 12-Nylon 3014U (produced by Ube Industries, Ltd.) | 8.0 | Ca stearate | 0.1 | 250 | 15 | 28.0 |
| Example 22 | Example 16 | 90.9 | 12-Nylon 3014U (produced by Ube Industries, Ltd.) | 9.0 | Ca stearate | 0.1 | 250 | 15 | 26.1 |
| Comparative Examples 19 | Comparative Examples 12 | 94.9 | Evaflex 250 (produced by Mitsui Polychemical Co., Ltd.) | 5.0 | Zn stearate | 0.1 | 110 | 15 | 20.8 |
| Comparative Examples 20 | Comparative Examples 13 | 94.9 | Evaflex 250 (produced by Mitsui Polychemical Co., Ltd.) | 5.0 | Zn stearate | 0.1 | 120 | 15 | 18.1 |
| Comparative Examples 21 | Comparative Examples 14 | 91.9 | 12-Nylon 3014U (produced by Ube Industries, Ltd.) | 8.0 | Ca stearate | 0.1 | 250 | 15 | 11.2 |
| Comparative Examples 22 | Comparative Examples 18 | 94.9 | Evaflex 250 (produced by Mitsui Polychemical Co., Ltd.) | 5.0 | Zn stearate | 0.1 | 120 | 15 | 16.0 |

EXAMPLE 23

41.92 kg of iron oxide (α-$Fe_2O_3$), 7.07 kg of nickel oxide (NiO), 2.71 kg of manganese oxide ($MnO_2$) and 10.07 kg of zinc oxide (ZnO) were mixed to produce a mixed powder for producing ferrite particles which correspond to 51.3 mol % of $Fe_2O_3$, 18.4 mol % of NiO, 6.1 mol % of MnO and 24.2 mol % of ZnO, respectively. The mixed powder was then charged into 60.0 l of an aqueous solution of 0.3 wt % of polycarboxylic acid ammonium salt (SN dispersant 5468: produced by Sannopco Co., Ltd.) based on the weight of the mixed powder for producing ferrite particles. The slurry concentration in the aqueous solution was 46.2 wt %. The slurry was spray-dried to obtain granules having an average particle diameter of 120 μm.

The granules obtained were calcined at a temperature of 1220° C. for 3 hours to obtain ferrite particles for a bonded magnetic core which was composed of manganese nickel zinc ferrite spherical particles. Thereafter, the thus-obtained ferrite particles were cooled flowing nitrogen gas.

The magnetic permeability of the ferrite particles for a bonded magnetic core obtained was 31.5. It was confirmed from the observation of the scanning-type electron micrograph shown in FIG. 7 that the ferrite particles were manganese zinc ferrite spherical particles which were composed of crystal grains 13.7 μm in average diameter and which had an average particle diameter of 87 μm and few pores.

EXAMPLE 24

Ferrite particles for a bonded magnetic core were produced in the same way as in Example 23 except for varying the composition of the mixed powder for producing ferrite particles, the kind and the amount of surfactant, the concentration of the mixed slurry for producing ferrite particles, the particle size of the granules and the calcining temperatures.

mold including every corner, the surface of the molded product was smooth and the circumferential portions of the upper surface and the lower surface of the cylinder are formed into complete circles without any chipping and deformation.

The magnetic permeability of the molded product was 28.7.

EXAMPLE 26

Ferrite resin composites were produced in the same way as in Example 25 except for varying the kind and the amount of ferrite particles, the king and amount of additive and the kneading temperature and time.

The main producing conditions and the properties of the composites obtained are shown in Table 6.

Since the ferrite resin composite filled in all parts of the mold including every corner, the molded product produced from the ferrite resin composite obtained in Example 26 had a smooth surface and complete circular circumferential portions of the upper surface and the lower surface of the cylinder without any chipping and deformation like the molded product obtained in Example 25.

TABLE 5

| Examples & Comparative Examples | Mixing ratio of raw materials: $Fe_2O_3$ (mol %) | NiO (mol %) | MnO (mol %) | ZnO (mol %) | Amount of Surfactant (wt %) | Slurry concentration (wt %) | Average particle diameter of granules (μm) | Calcining temperature (°C.) | Ferrite particles for bonded magnetic core: Magnetic permeability | Average particle diameter of crystal grains (μm) | Average particle diameter (μm) |
|---|---|---|---|---|---|---|---|---|---|---|---|
| Example 23 | 51.3 | 18.4 | 6.1 | 24.2 | 0.3 | 46.2 | 120 | 1220 | 31.5 | 13.7 | 87 |
| Example 24 | 53.4 | 11.5 | 11.5 | 23.6 | 0.3 | 48.8 | 97 | 1250 | 33.4 | 15.2 | 104 |

TABLE 6

| Examples & Comparative Examples | Manufacture of ferrite resin composite: Ferrite particles Kind | Ferrite particles Amount (wt %) | Resin Kind | Resin Amount (wt %) | Additive Kind | Additive Amount (wt %) | Kneading Temperature (°C.) | Kneading Time (min.) | Ferrite resin composite Magnetic permeability |
|---|---|---|---|---|---|---|---|---|---|
| Example 25 | Example 23 | 94.9 | Evaflex 250 (produced by Mitsui Polychemical Co., Ltd.) | 5.0 | Zn stearate | 0.1 | 110 | 15 | 28.7 |
| Example 26 | Example 24 | 92.9 | Evaflex 250 (produced by Mitsui Polychemical Co., Ltd.) | 7.0 | Zn stearate | 0.1 | 100 | 15 | 30.5 |

The main producing conditions and the properties of the ferrite particles for a bonded magnetic core are shown in Table 5.

EXAMPLE 25

95 g (equivalent to 94.9 wt % based on the composite) of the ferrite particles obtained in Example 23, 5 g (equivalent to 5.0 wt % based on the composite) of ethylene-vinyl acetate copolymer resin (Evaflex 250, density: 0.95 g/cc, produced by Mitsui Polychemical Co., Ltd.) and 0.1 g (equivalent to 0.1 wt % based on the composite) of zinc stearate were kneaded at 110° C. for 15 minutes by a blast mill 30C-150 (produced by Toyo Seiki Co., Ltd.) to obtain a kneaded mixture.

The thus-obtained kneaded mixture was granulated into granules having an average particle diameter of about 3 mm, and press-molded at a temperature of 75° C. and a pressure of 1.5 ton/cm$^2$ to obtained a cylindrical molded product having an outer diameter of 36 mm, an inner diameter of 24 mm and a height of 10 mm. Since the ferrite resin composite filled in all parts of the

What is claimed is:

1. Ferrite spherical particles for a bonded magnetic core comprising crystal gains of 5 to 15 μm in average diameter, having an average particle diameter of 20 to 150 μm and a magnetic permeability of not less than 24, and consisting essentially of 47 to 58 mol % of $Fe_2O_3$, 10 to 30 mol % of nickel oxide, manganese oxide or nickel.manganese oxide (calculated as NiO, MnO or NiO.MnO) and 15 to 40 mol % of zinc oxide (calculated as ZnO).

2. Ferrite spherical particles according to claim 1, wherein the composition consists essentially of 47 to 55 mol % of $Fe_2O_3$, 10 to 23 mol % of nickel oxide (calculated as NiO) and 25 to 40 mol % of zinc oxide (calculated as ZnO).

3. Ferrite spherical particles according to claim 1, wherein the composition consists essentially of 47 to 58 mol % of $Fe_2O_3$, 22 to 30 mol % of manganese oxide (calculated as MnO) and 15 to 32 mol % of zinc oxide (calculated as ZnO).

4. Ferrite spherical particles according to claim 1, wherein the composition consists essentially of 47 to 58 mol % of $Fe_2O_3$, 15 to 28 mol % of nickel.manganese oxide (calculated as NiO.MnO) and 20 to 35 mol % of zinc oxide (calculated as ZnO).

5. Ferrite spherical particles according to claim 1, produced by mixing a powder for producing ferrite particles consisting essentially of 47 to 58 mol %, calculated as $Fe_2O_3$, of an iron oxide or iron oxide hydroxide powder, 10 to 30 mol %, calculated as NiO, of a nickel oxide powder, calculated as MnO, of a manganese oxide powder or calculated as NiO and MnO, of a nickel oxide powder and manganese oxide powder and 15 to 40 mol %, calculated as ZnO, of an zinc oxide powder as a starting material into and with water containing 0.2 to 1.0 wt % of a surfactant based on the weight of the powder for producing ferrite particles so as to prepare a water-dispersed slurry having a slurry concentration of 40 to 60 wt %, spray-drying the resultant slurry so as to obtain spherical granules having an average particle diameter of 25 to 180 μm, and calcining the obtained spherical granules at a temperature of 1100° to 1350° C.

6. A ferrite resin composite comprising 90 to 95 wt % of ferrite spherical particles which comprises crystal grains of 5 to 15 μm in average diameter and have an average particle diameter of 20 to 150 μm, and 5 to 10 wt % of base materials of a resin composite, said ferrite resin composite having a magnetic permeability of not less than 24.

7. A ferrite resin composite according to claim 6, wherein said ferrite particles spherical have a composition of 47 to 58 mol % of $Fe_2O_3$, 10 to 30 mol % of nickel oxide, manganese oxide or nickel.manganese oxide (calculated as NiO, MnO or NiO.MnO) and 15 to 40 mol % of zinc oxide (calculated as ZnO).

8. A ferrite resin composite according to claim 7, wherein said ferrite spherical particle composition consists essentially of 47 to 55 mol % of $Fe_2O_3$, 10 to 23 mol % of nickel oxide (calculated as NiO) and 25 to 40 mol % of zinc oxide (calculated as ZnO).

9. A ferrite resin composite according to claim 7, wherein said ferrite spherical particle composition consists essentially of 47 to 58 mol % of $Fe_2O_3$, 22 to 30 mol % of manganese oxide (calculated as MnO) and 15 to 32 mol % of zinc oxide (calculated as ZnO)

10. A ferrite resin composition according to claim 7, wherein said ferrite spherical particles have a composition of 47 to 58 mol % of $Fe_2O_3$, 15 to 28 mol % of nickel.manganese oxide (calculated as NiO.MnO) and 20 to 35 mol % of zinc oxide (calculated as ZnO).

* * * * *